US010282255B2

(12) United States Patent
Nichols et al.

(10) Patent No.: US 10,282,255 B2
(45) Date of Patent: May 7, 2019

(54) COORDINATING FILE SYNCHRONIZATION BETWEEN A SYNC ENGINE AND ANOTHER APPLICATION THAT SUPPORTS DOCUMENT COLLABORATION

(71) Applicant: Microsoft Technology Licensing, LLC, Redmond, WA (US)

(72) Inventors: Jack Allen Nichols, Bothell, WA (US); Benjamin M. Yim, Redmond, WA (US); Adam Christopher Czeisler, Seattle, WA (US); Amnon I. Govrin, Bellevue, WA (US); Michal Krzysztof Piaseczny, Bellevue, WA (US); Marcus Eduardo Markiewicz, Mercer Island, WA (US); Daniel Vincent Fiordalis, Seattle, WA (US); Jonathan Alexander Bockelman, Kirkland, WA (US); Marcelo Albuquerque Fernandes Mas, Redmond, WA (US); Chris J. Guzak, Redmond, WA (US); Michael J. Novak, Redmond, WA (US); Juan-Lee Pang, Redmond, WA (US); Tyler Kien Beam, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 673 days.

(21) Appl. No.: 15/061,124

(22) Filed: Mar. 4, 2016

(65) Prior Publication Data

US 2017/0017551 A1     Jan. 19, 2017

Related U.S. Application Data

(60) Provisional application No. 62/193,022, filed on Jul. 15, 2015.

(51) Int. Cl.
*G06F 17/00* (2006.01)
*G06F 17/30* (2006.01)
(Continued)

(52) U.S. Cl.
CPC ...... *G06F 11/1451* (2013.01); *G06F 17/3033* (2013.01); *G06F 17/30174* (2013.01);
(Continued)

(58) Field of Classification Search
CPC .......... G06F 11/1451; G06F 17/30174; G06F 2201/80; G06F 2201/84; H04L 67/1095
See application file for complete search history.

(56) References Cited

U.S. PATENT DOCUMENTS 6,341,291 B1    1/2002    Bentley et al.
8,515,902 B2    8/2013    Savage
(Continued)

OTHER PUBLICATIONS

Alysson Bessani et al., "SCFS: A Shared Cloud-Backed File System", USENIX The Advanced Computing Systems Association, Proceedings of USENIX ATC'14: 2014 USENIX Annual Technical Conference, Jun. 19-20, 2014, pp. 168-180. (Year: 2014).*

(Continued)

*Primary Examiner* — Cheryl Lewis
(74) *Attorney, Agent, or Firm* — Christopher J. Volkmann; Kelly, Holt & Christenson, PLLC

(57) ABSTRACT

A synchronization engine detects a notification of a change to a file. It determines whether an application associated with the file has indicated that the file is to be synchronized by the application. If so, the changes to the file are synchronized between a cloud-based storage system and a local disk by the application. Collaborative metadata, associated with the synchronized file, is updated to indicate a state of a copy of the file on the local disk and a copy of the file in the (Continued)

cloud-based storage system. The collaborative metadata is stored by the synchronization engine.

20 Claims, 12 Drawing Sheets

(51) Int. Cl.
    *G06F 11/14*     (2006.01)
    *G06Q 10/10*     (2012.01)
    *H04L 29/08*     (2006.01)

(52) U.S. Cl.
    CPC ....... *G06Q 10/101* (2013.01); *H04L 67/1095* (2013.01); *G06F 2201/80* (2013.01); *G06F 2201/84* (2013.01)

(56) References Cited

U.S. PATENT DOCUMENTS

| | | |
|---|---|---|
| 8,825,758 B2 | 9/2014 | Bailor et al. |
| 2013/0138608 A1 | 5/2013 | Smith |
| 2013/0191339 A1 | 7/2013 | Haden et al. |
| 2013/0227085 A1* | 8/2013 | Choi ............... H04L 67/1095 709/219 |
| 2013/0268491 A1* | 10/2013 | Chung ............. G06F 17/30174 707/634 |
| 2014/0181040 A1 | 6/2014 | Montulli et al. |
| 2014/0215303 A1 | 7/2014 | Grigorovitch et al. |
| 2014/0281875 A1 | 9/2014 | Branton et al. |
| 2014/0297586 A1* | 10/2014 | Kim ................. G06F 17/30117 707/610 |
| 2014/0358860 A1* | 12/2014 | Wautier ........... G06F 17/30575 707/638 |

OTHER PUBLICATIONS

"Central Desktop Unveils Game-Changing Microsoft Office Collaboration Tool", Published on: May 4, 2010, https://www.centraldesktop.com/press-releases?p=sharepoint-alternative-microsoft-office&id=41.

"MangoApps for Windows—Office Plugin", Published on: Aug. 25, 2012, Available at: http://help.mangoapps.com/office-connect#Sync.

"Overview of co-authoring in SharePoint 2013", Published on: Jan. 15, 2013 Available at: https://technet.microsoft.com/en-us/library/ff718249.aspx.

"Co-Authoring and Synced Documents", Published on: Sep. 30, 2013, Available at: http://mad.b.net.nz/2013/09/30/co-authoring-and-synced-documents/.

"Core Document Management Features", Retrieved on: May 15, 2015, Available at: http://www.mangoapps.com/core-document-features.

International Preliminary Report on Patentability for International Patent Application No. PCT/US2016/042178, dated Jun. 23, 2017, date of filing: Jul. 14, 2016, 8 pages.

International Search Report and Written Opinion for International Patent Application No. PCT/US2016/042178, dated Oct. 24, 2016, date of filing: Jul. 14, 2016, 13 pages.

Anonymous: "Introduction to Microsoft Sync Framework File Synchronization Provider", Oct. 2009, Retrieved from the Internet: URL:https://msdn.microsoft.com/en-us/library/mt763483.aspx, Retrieved on: Oct. 10, 2016, 10 pages.

* cited by examiner

COORDINATING FILE SYNCHRONIZATION BETWEEN A SYNC ENGINE AND ANOTHER APPLICATION THAT SUPPORTS DOCUMENT COLLABORATION

CROSS-REFERENCE TO RELATED APPLICATION

The present application is based on and claims the benefit of U.S. provisional patent application Ser. No. 62/193,022, filed Jul. 15, 2015, the content of which is hereby incorporated by reference in its entirety.

BACKGROUND

There are a wide variety of different types of computing systems. Some computing systems run applications that allow a user to author and edit documents. Some such applications include word processing applications, slide presentation applications, spreadsheet applications, among a wide variety of others. These types of applications often allow documents to be stored in files in a file system.

Some computing systems have portions deployed in a cloud computing (or other remote server) environment. For instance, some computing systems store files on a cloud computing data storage system. However, during authoring and editing of a document, the files may also be stored on a local disk by the application. Similarly, some systems have applications that support document collaboration, such as merge, sharing, co-authoring, and other functionality. Some systems thus have a synchronization engine (or sync engine) that is responsible for detecting and synchronizing changes to files and folders between a local disk and a cloud storage system.

In order to do this, a sync engine can track the state of both the file that is stored on the disk and that stored in the cloud, and reconcile those states when it receives information that something has changed. For instance, if a file is edited on a local disk, the sync engine may detect that change, realize it needs to send the change to the cloud, send the change, it may wait for the cloud to respond, and then update its local state information to indicate that the change has been made.

A file can change in both the cloud storage system and on the local disk. If those changes are different from one another this can create a conflict. When a conflict exists, the synchronization engine is unable to upload the disk file to the cloud storage system without overwriting what is in the cloud storage system. Likewise, it is unable to download the cloud-based file to the local disk without overwriting the changes on the local disk. When the change to the cloud system and the local disk are the same, then no conflict exists.

One way that the conflict problem has been addressed is to "fork" the file. The "fork" can be created by renaming the file on the disk to a unique name, and then synchronizing down the content from the cloud, to the local disk. The renamed file is then sent up to the cloud storage system as a new file. Forking thus inhibits the loss of changes, but it results in the user having two files with changes, instead.

Another approach to handling this type of conflict is to allow applications, themselves, to merge and co-author files. In one example of this type of architecture, the cloud-based storage system delegates synchronization of the documents to an application that supports co-authoring. For instance, when a change is received for such a document, instead of downloading it, the cloud-based storage system requests the authoring application to do so. As part of this process, the co-authoring application reconciles changes between the local disk and the cloud-based storage system in order to support the co-authoring functionality.

This latter approach means that the cloud-based storage system and the application must communicate with one another in a relatively complex manner. In one example, a COM (or other) connection is established over which a relatively rich set of messages passes that describe the actions that the other party needs to take, in order to synchronize changes. This results in significant complexity. The complexity arises from maintaining the state of the file in two places. Also, because of differences in how the application and the synchronization functionally handle files, some large discrepancies in the maintained file states can result.

Some applications also run in an application container that is isolated from other processes. This makes the complex nature of the communication even more difficult.

The discussion above is merely provided for general background information and is not intended to be used as an aid in determining the scope of the claimed subject matter.

SUMMARY

A synchronization engine detects a notification of a change to a file. It determines whether an application associated with the file has indicated that the file is to be synchronized by the application (e.g., if the file is open in an application that supports co-authoring). If so, the changes to the file are synchronized between a cloud-based storage system and a local disk by the application, otherwise, the synchronization engine performs the synchronization. Collaborative metadata, associated with the synchronized file, is updated to indicate a state of a copy of the file on the local disk and a copy of the file in the cloud-based storage system. The collaborative metadata is stored by the synchronization engine.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
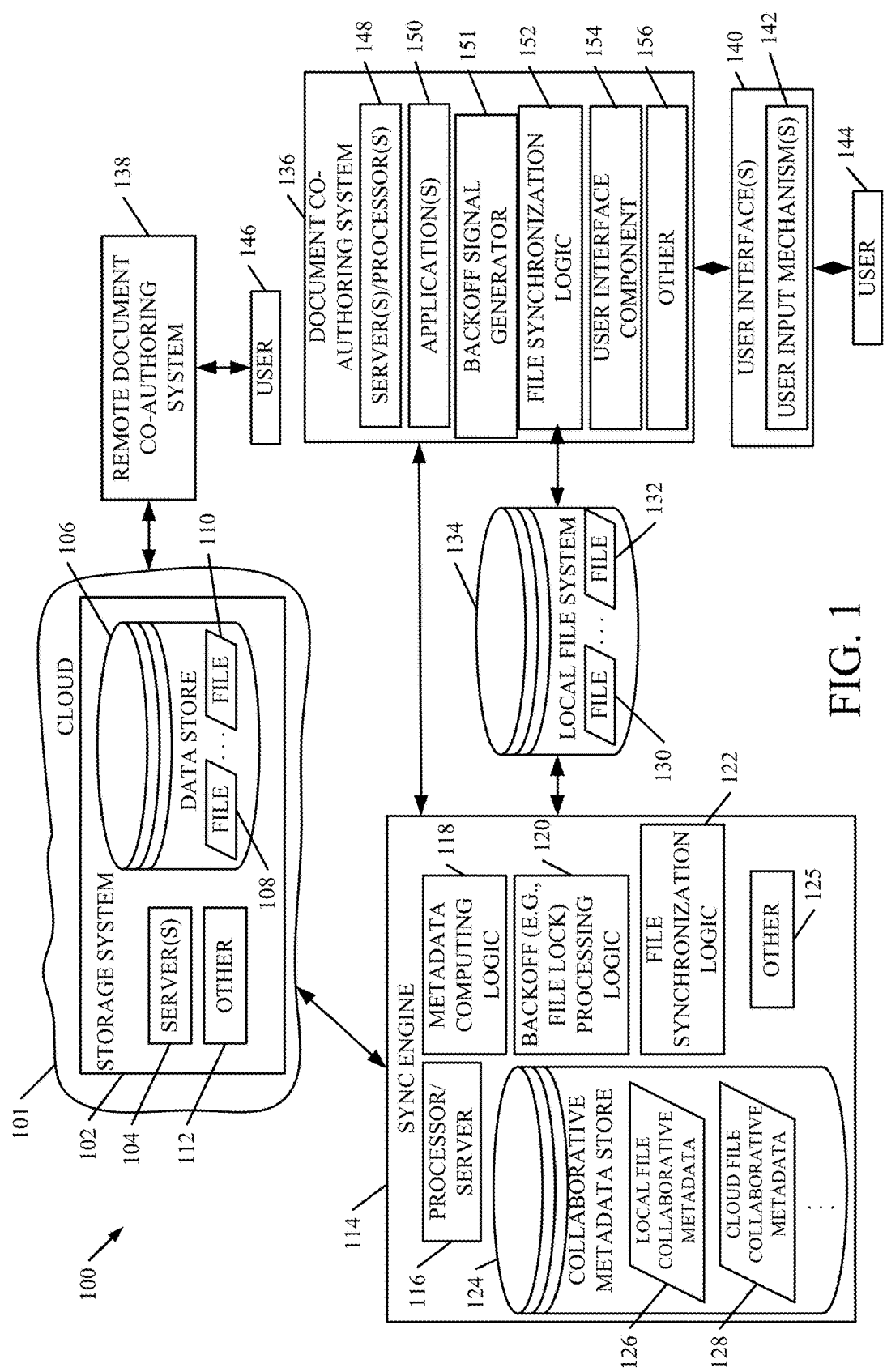
FIG. 1 is a block diagram of one example of a file synchronization architecture.

FIG. 1 is a block diagram of one example of a file synchronization architecture 100. Architecture 100 illustratively includes a cloud 101 and a cloud-based storage system 102 that includes one or more servers 104 and data store 106 that stores files 108-110. Storage system 102 can include other items 112 as well. As will be described below, data store 106 may store a number of different versions of the same file, and it can store multiple different files as well.

The example of architecture 100 shown in FIG. 1 also includes synchronization engine 114. It will be noted that synchronization engine 114 can be deployed in cloud 101 as well, but it is shown separately for the sake of example. Synchronization engine 114 can include one or more processors or servers 116, metadata computing logic 118, backoff processing logic (which may also be referred to as file lock processing logic) 120, file synchronization logic 122, and collaborative metadata store 124. It can also include other items 125. In one example, metadata computing logic 118 can maintain and communicate a set of collaborative metadata for each file that is being synchronized. That is, each file may have its own metadata. The collaborative metadata, for each file, can include a set of local file collaborative metadata 126 and a set of cloud file collaborative metadata 128. Metadata 126 may illustratively correspond to files 130-132 that are stored on a local file system 134 (or local disk). Metadata 128 can correspond to files 108-110 that are stored on data store 106 in cloud-based storage system 102.

Architecture 100 also illustratively includes co-authoring system 136 and one or more remote co-authoring systems 138. System 136 illustratively generates user interfaces 140 with user input mechanisms 142 for interaction by user 144. User 144 illustratively interacts with user input mechanisms 142 in order to control and manipulate co-authoring system 136. User 146 also illustratively interacts with user input mechanisms in order to control and manipulate remote co-authoring application system 138.

While systems 136 and 138 may be similar systems, only system 136 will be described in detail, for the sake of example. System 136 illustratively includes one or more servers or processors 148, one or more applications 150, backoff signal generator 151, file synchronization logic 152, user interface component 154, and it can include a wide variety of other components, logic or functionality 156. In one example, servers or processors 148 illustratively run one or more applications 150 that can be used to author and edit documents or files. For instance, the applications 150 can include a word processing application, a slide presentation application, a spreadsheet application, an electronic mail application, a document management application, etc. The applications 150 can illustratively support document collaboration.

Document collaboration means several authors work on a document or collection of documents together. They could be simultaneously co-authoring a document, sharing a document, or reviewing a specification as part of a structured workflow. Document co-authoring can involve working on a document simultaneously with one or more users and merging changes. There are different methods of document collaboration and co-authoring that gradually involve more structure and control around the document collaboration experience. While some forms of collaboration are described herein, the way that a given document collaboration system works is not important for purposes of the present description and the discussion of different levels of collaboration or co-authoring is provided for the sake of example only.

Semiformal co-authoring involves multiple authors editing simultaneously anywhere in the document. Examples include: recurring minutes, brainstorming sessions, and reference material for a notebook application and team-developed financial models, budgets, and asset tracking lists for a spreadsheet.

Formal co-authoring involves multiple authors editing simultaneously in a controlled way by saving content when it is ready to be revealed. Examples include: business plans, newsletters, and legal briefs for word processing applications and marketing and conference presentations for slide presentation applications.

Comment and review involves a primary author soliciting edits and comments (which can be threaded discussions) by routing the document in a workflow, but controlling final document publishing. Examples include online Help, white papers, and specifications.

Document sets involve authors starting workflows on an entire document set or individual items within the document set to manage common tasks such as review and approval.

These are only some examples of document collaboration (also referred to herein as co-authoring).

Thus, multiple authors can work on the same document, and the changes can be merged using co-authoring functionality. For instance, user 146 and user 144 may be working on the same document. The changes to the document are illustratively synchronized either by co-authoring and merging functionality in the application itself, or by synchronization engine 114. In addition, metadata computing logic 118 illustratively computes metadata 126 and metadata 128 for the various versions of the document that can be stored on local file system 134 and in cloud-based data store 106. This collaborative metadata, as will be discussed below, will be used to maintain the various versions of the file, in synchronization with one another.

Each system 136-138 may have its own file synchronization logic (such as logic 152). Each system 136-138 can thus allow synchronization engine 114 to synchronize changes to the various files, or it can indicate to synchronization engine 114 that it is to backoff and not to synchronize the changes, and, instead, the systems 136 and 138 can do it themselves. A number of examples of this are described in more detail below.

Before describing the operation of architecture 100 in more detail, a brief description of some of the items in architecture 100 will first be provided. It is first worth noting that, in the overall operation of architecture 100 sync engine 114 is primarily responsible for synchronizing all files between file system 134 and cloud-based data store 106. However, at any point, backoff signal generator 151 in co-authoring system 136 or system 138 can indicate to sync engine 114 that it should backoff (e.g., on a file-by-file basis) and stop syncing for a time, while the particular system 136 or 138 synchronizes files on its behalf. In one example described herein, this can be done by locking a file so sync engine 114 cannot access it. However, it will be appreciated that backoff signal generator 151 can generate the backoff signal as a separate signal or in other ways as well and locking the file is only one example. While this is happening, sync engine 114 receives updates about the state of the file from both system 136 and servers 104 on cloud-based storage system 102, (through the collaborative metadata) and is able to reconcile the changes and store them in its local collaborative metadata store 124. At some point, backoff signal generator 151 in system 136 releases sync engine 114 so that it can resume synchronizing the file. This synchronization model is thus dramatically different and simpler than prior models. The only messages that system 136 and sync engine 114 are to exchange include a message from system 136 to sync engine 114 that engine 114 is to backoff (or is released from a backoff request) and communications to get and set collaborative metadata about the file in data store 124. Further, prior models were imperative, in which one component commanded the other, whereas, in the present model, system 136 and sync engine 114 are declarative, meaning that they both declare their state and check the state of the other.

Metadata computing logic 118 illustratively computes the values for the collaborative metadata and keeps them up to date. It will be noted that other items in architecture 100 can also compute collaborative metadata, but store 124 (which stores metadata values mastered by cloud storage system 102) stores a single source of truth of the metadata values for all of systems 102, and 136 and perhaps 138 (which could use another instance of store 124 or even a different source for metadata).

Figure 2A:
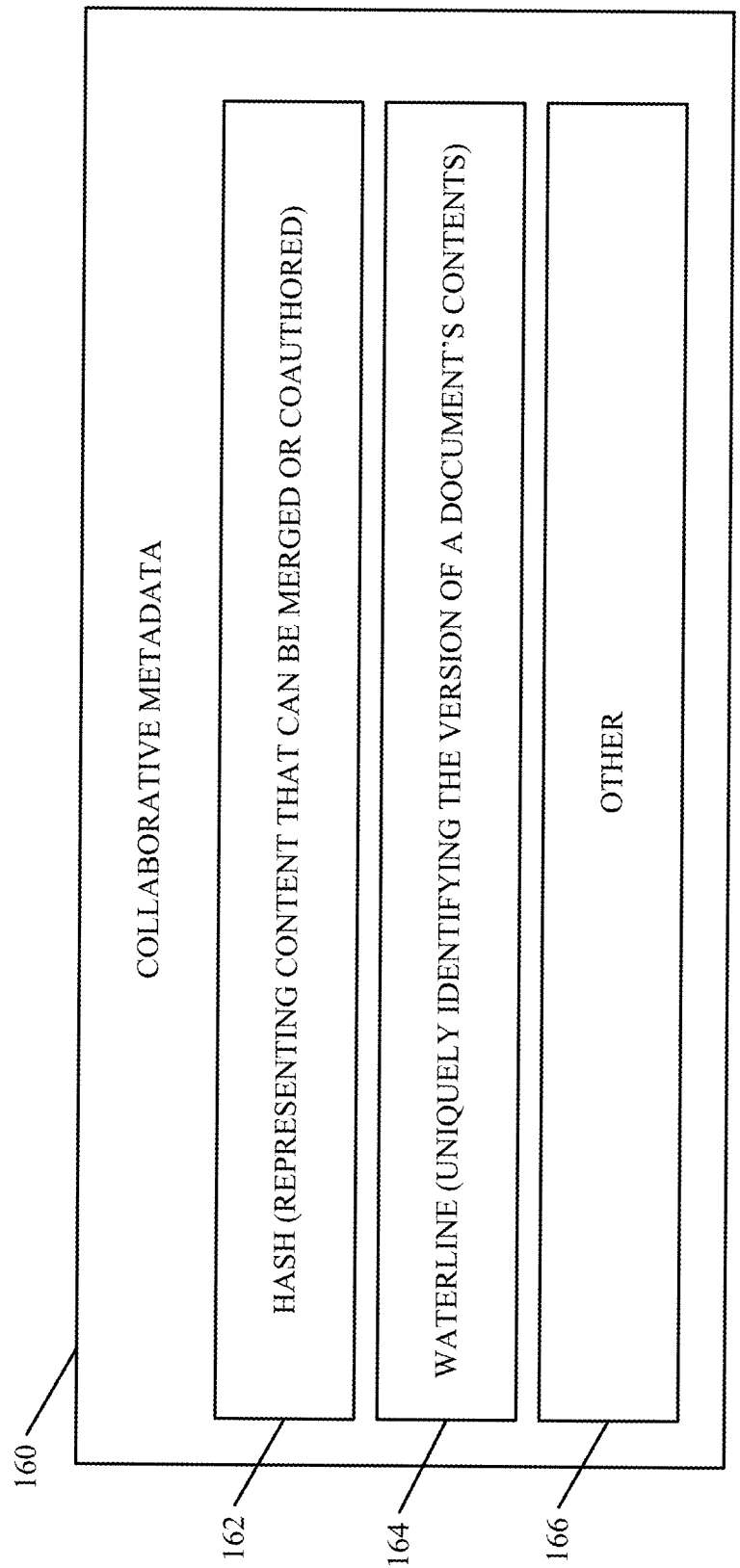
FIG. 2A is a block diagram of one example of collaborative metadata.

It will be noted that collaborative metadata for a file points to the state of the file at a certain point in time and allows the co-authoring system 136, sync engine 114 and storage system 102 to understand, determine, or identify a timeline relationship among the states of the file at the different endpoints in architecture 100. In one example, the collaborative metadata includes two pieces of data. FIG. 2A illustrates one example of this, and it is reiterated that this is just an example. FIG. 2A shows that collaborative metadata 160 (which can, for instance be local file collaborative metadata 126 or cloud file collaborative metadata 128 shown in FIG. 1) illustratively includes a hash value 162, a waterline value 164, and it can include other items 166. Hash value 162 is a hash of the content that can be merged or co-authored in a file. This hash value 162 is illustratively shared between cloud-based storage system 102 and system 136, as well as sync engine 114.

Sync engine 114 can use the hash value information to determine whether a change originates locally. For instance, if the hash value for a document downloaded from cloud storage system 102 matches that received from system 136, then sync engine 114 knows the change was made by system 136 and not another system 138. This, however, can be provided by an explicit "originator ID" field, which specifically identifies the originator of a change, in which case the hash value is not needed. Thus, it should be noted that the metadata used will depend on properties of the co-authoring application, and can vary greatly.

With respect to the present example, all three of these items (102, 136 and 114) illustratively have logic that can compute the hash value and compare it. In another example, any of the systems or engines shown in architecture 100 can delegate computation of the hash value to other systems or engines as well. For instance, in one example, sync engine 114 may be configured so that it does not compute the hash value but only compares the values generated by system 102 and system 136 to determine equality. This type of architecture is contemplated herein.

Referring again to FIG. 2A, the waterline value illustratively uniquely identifies the version of a document's contents. It will also be noted that, in one example, cloud-based storage system 102 can also maintain a separate tag which corresponds to a version number for all files that it stores. The tag may generally be bumped or incremented when metadata about the file changes.

The collaborative metadata illustrated in FIG. 2A can be used by system 136 and system 102 for a variety of different reasons. For example, it can use the collaborative metadata to determine if a file is up-to-date by doing a simple equality comparison with a collaborative metadata corresponding to the file that it currently has stored.

In another example, the systems can use the collaborative metadata to reconcile changes to a file or document. System 136, for instance, can ask server 104 in storage system 102 for a base version of a document being edited, by providing the corresponding waterline value 164. Server 104 illustratively maintains a certain number of document versions for each document, keyed by waterline, in data store 106. Using the base version provided by server 104, file synchronization logic 152 in system 136 can compare the file it has on disk (e.g., in local file system 134) with the current server copy that it received from server 104 (which may be different from the base copy) and resolve any conflicts.

This shows a significant difference between architecture 100 and prior synchronization architectures. In some prior architectures, system 136 needed to maintain a cache of the base version of all files or documents. With the present architecture 100, this is not needed, because system 136 can obtain the base version from storage system 102 (which can be stored in store 124 and mastered by system 102). This dramatically improves the reliability of the computing system because there is a single source of truth about the document in system 102, as opposed to two different systems (system 102 and system 136) attempting to maintain two different (and often diverging) sources of truth for that document.

Sync engine 114 provides an interface through which systems 136 and 138 can get and set file properties. Sync engine 114 illustratively knows the properties of the file on the local disk and needs to know if they have changed while sync engine 114 is backing off. System 136 uses the functionality on the interface to get and set properties to ensure that it knows the properties stored in sync engine 114 and can set new properties in sync engine 114 based on changes that system 136 has made.

This interaction is different than that between system 102 and sync engine 114. System 102 can preferentially use its knowledge of the properties over that provided by sync engine 114. This is because the properties sent by sync engine 114 to system 102 reflect those for the file on the local disk. In contrast, sync engine 114 receives the properties from the file in the cloud system from system 102.

In one example, the interface can support reading and writing more properties than just the collaborative metadata. For instance, the interface may be configured so that sync engine 114 can return the collaborative metadata (e.g., the waterline and hash), a unique file identifier (or resource ID), the file's last known path, and a resource locator that can be used for creating, changing and moving documents on a server (such as using a distributed authoring and versioning protocol) or otherwise. Also, in one example, the interface is supported so that systems 136 and 138 can set the collaborative metadata values (e.g., the waterline and hash values). As is described in more detail below, in one scenario where a file already exists, system 136 requests some of the properties and occasionally sets properties for the file. The behavior of server 116 in reading and writing these properties is to queue a work item in order to get or set the properties to or from the data store 124.

There is also a scenario in which system 136 has a new file that system 102 has not heard of and thus no database entry exists for it. For example, if system 136 creates a new file on local file system 134 and sets its properties in sync engine 114, but server 102 has not yet heard about the change, server 102 is able to handle this. Server 102 handles this by creating an unrealized file row in its data store, with the properties it receives from system 136. Later, when system 136 uploads the file, it reconciles this data with what's in the unrealized row, merges this into the main data store, and drops the unrealized row.

When an unrealized file is created in this way, system 136 provides not only the collaborative metadata to server 102 but also the resource ID and the path for the file that it is creating. This information is used by server 102 in creating the unrealized file entry.

The unrealized file mechanism is only one way of handling this. Others can be used as well.

It should also be noted that, in one example the interface between storage system 102 (which can include sync engine 114) and system 136 can be a COM interface, marshaled by a runtime broker, but it could be others as well. This allows system 136 to be an isolated (or sandboxed) application that runs within a container. Thus, although system 136 may not be able to communicate directly with system 102, it can communicate with a runtime broker and it can thus still communicate with storage system 102, using the COM (or other) interface.

Because sync engine 114 acts as a store for collaborative metadata, it synchronizes this collaborative metadata from cloud-based storage system 102. In general, the collaborative metadata is updated into the collaborative metadata store 124 in a number of different ways. First, when system 136 updates it by calling the set properties application programming interface (API) mentioned above. This action is preceded by a save of the file to disk in local file system 134. It will be noted, however, that a save to the disk does not always mean that a set properties call will follow.

Sync engine 114 also synchronizes the collaborative metadata in data store 124 when a change notification is received from storage system 102 indicating that a change has occurred. For instance, when a file is uploaded from system 136 to data store 106, system 136 also saves the file to disk in local file system 134. In this scenario, the collaborative metadata is computed by storage system 102, and sync engine 114 synchronizes it to data store 124. In addition, when a file is uploaded to data store 106 either by a website or by a client uploading the file itself, in either of these cases, server 104 illustratively computes the collaborative metadata and sync engine 114 synchronizes it to its data store 124. It will be noted that, sync engine 114 need not attempt to upload collaborative metadata to storage system 102 in the cloud. This is because server 104 automatically computes the collaborative metadata when a file on data store 106 is changed.

Figure 2B:
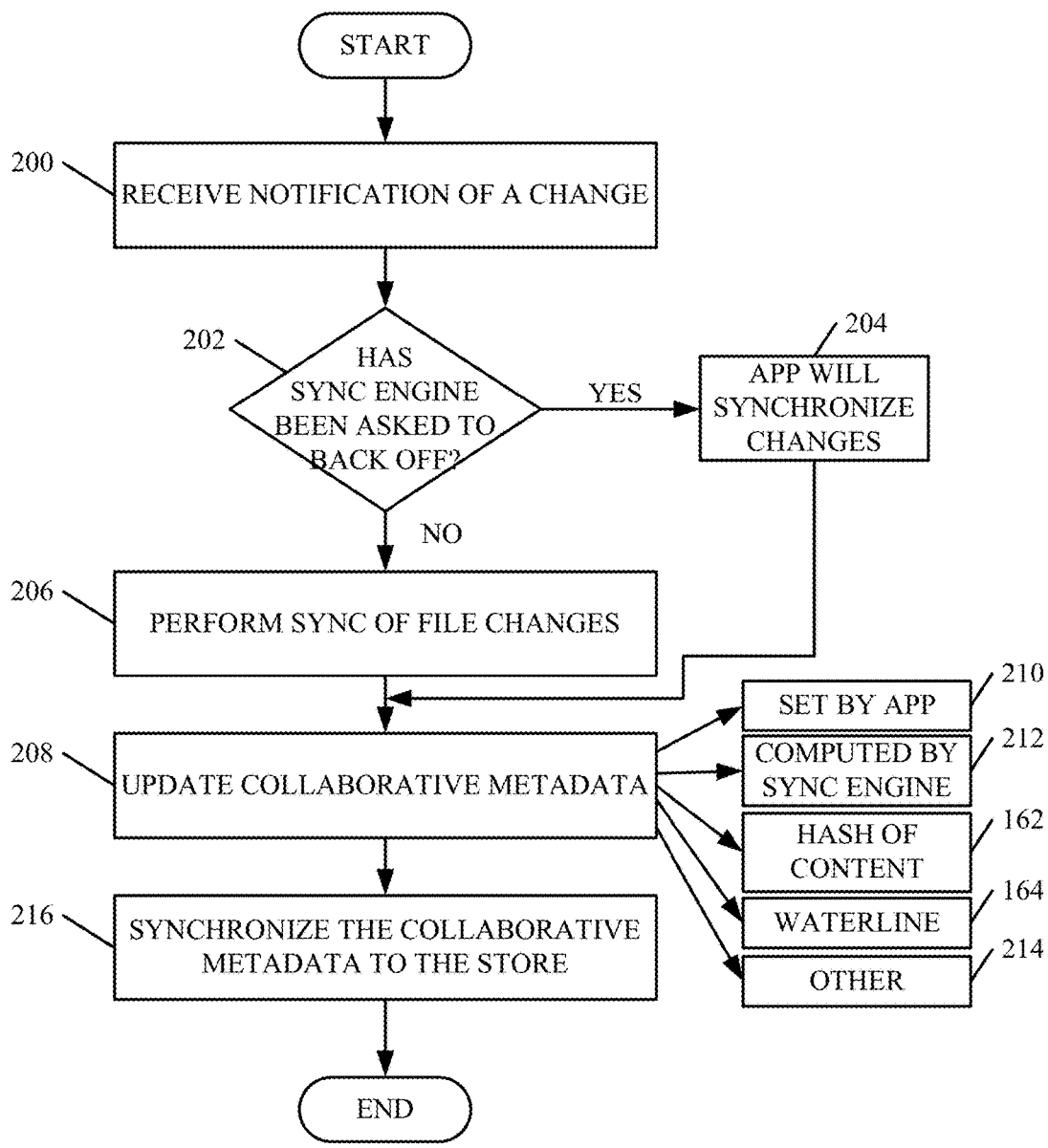
FIG. 2B is a flow diagram illustrating one example of the operation of a synchronization engine in the architecture shown in FIG. 1.

FIG. 2B is a flow diagram illustrating one example of the overall architecture of FIG. 1. Synchronization engine 114 first receives a notification of a file change. This is indicated by block 200 in FIG. 2B. It is assumed that the notification has either been received from storage system 102 or from system 136.

File lock processing logic 120 then determines whether system 136 has indicated that sync engine 114 is to backoff, and not synchronize the file (because it is doing so itself). This is indicated by block 202 in FIG. 2B. In one example, there are a variety of different ways by which backoff signal generator 151 in system 136 can signal sync engine 114 to backoff. For example, logic 120 may receive a signal from generator 151 indicating it should backoff. In another example, logic 120 may use two relatively simple tests to determine whether it is to backoff. The first test is to determine whether the file is open in a sharing mode that locks the file so that sync engine 114 cannot read or delete the file. This test can be applied by making a call attempting to read the file. One example of such a call is the CreateFile call as follows:

TABLE 1

HANDLE hFile = CreateFile(filePath,
   GENERIC_READ | DELETE,
   FILE_SHARE_READ,
   nullptr,
   OPEN_EXISTING,
   FILE_ATTRIBUTE_NORMAL,
   nullptr);

If this call fails, this means that system 136 has the file open according to the first test.

A second test is to determine whether the file is supported for co-authoring. In such a case, logic 120 first determines whether the file is qualified, meaning that it is associated with an application that supports co-authoring. It can do this by examining the extension on the file to determine a particular application with which the file is associated. If the file is a qualified file, then file lock processing logic 120 evaluates the version of the application that the file is associated with to see whether it is a version that incorporates co-authoring functionality. This may be done, for instance, by comparing the extension to a list of valid extensions, or by determining the actual association. In another example, it simply determines whether the version number is high enough to correspond to a version of the application that supports co-authoring. If so, then the file passes the second test.

If either tests fail after having previously passed, then file lock processing logic 120 determines that sync engine 114 is no longer supposed to backoff, and it resumes synchronizing the file. However, if both tests are passed, then system 136 is signaling to sync engine 114 that it is to backoff, because file synchronization logic 152 in system 136 is, itself, synchronizing the file.

It should be noted that these are only two example tests that can be used. Instead, for instance, file lock processing logic 120 can simply apply the first test and determine that it can't open the file. It can then assume that the file is co-authorable and that the application is synchronizing the file. This is contemplated herein as well.

Referring again to the flow diagram of FIG. 2B, if sync engine 114 determines that system 136 is asking it to backoff, this means that the application 150 currently being run by system 136 will synchronize the changes, itself. This is indicated by block 204. However, if not, then file synchronization logic 122 in sync engine 114 performs the synchronization of the file changes. This is indicated by block 206.

In either case, the collaborative metadata is still updated in data store 124. This is indicated by block 208 in FIG. 2B. In one example, the collaborative metadata is computed by file synchronization logic 152 in system 136, and system 136 sets the collaborative metadata properties in data store 124 by calling the appropriate interface, discussed above. This is indicated by block 210. In another example, metadata computing logic 118 in sync engine 114 computes the collaborative metadata and stores it in data store 124. This is indicated by block 212. As discussed above, the collaborative metadata can be computed as hash value 162 which represents the content that can be merged or co-authored in the file being synchronized. It can also be computed to include waterline 164 which uniquely identifies the version of a document's or file's contents. The collaborative metadata can include other items 214, as well.

Once the collaborative metadata is computed, it is synchronized to the collaborative metadata store 124. This is indicated by block 216.

Given the different ways that collaborative metadata in data store 124 is updated, a number of different race conditions can exist. These race conditions are normally caused by the fact that system 136 can write the file to both the cloud data store 106 and to the disk in local file system 134. Depending on the order in which this occurs, and the order in which sync engine 114 sees the changes, different permutations of races can occur. FIGS. 3-6 are flow diagrams illustrating the operation of architecture 100 in handling a number of these different types of race conditions. These are examples only.

Figure 3:
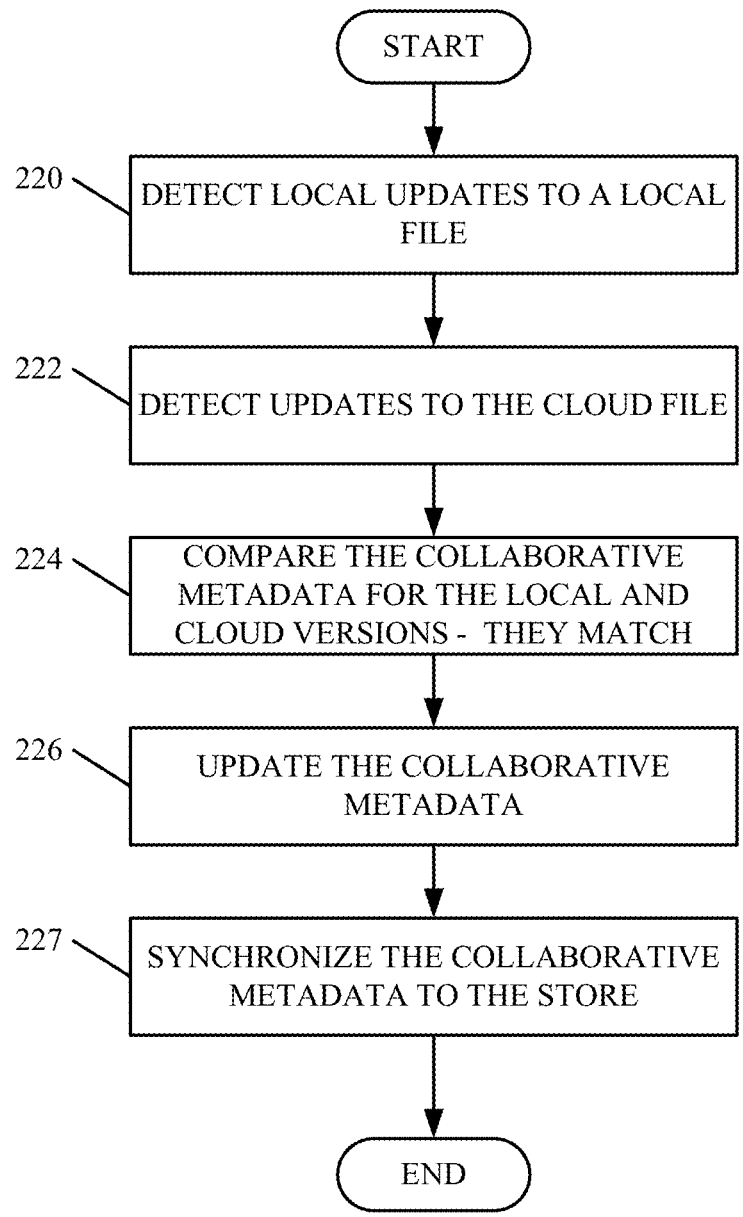
FIGS. 3-6 are flow diagrams illustrating various examples of the operation of the synchronization engine under a variety of different race conditions.

In a first race condition addressed by the flow diagram illustrated in FIG. 3, sync engine 114 is first notified that system 136 has updated the file on disk in local file system 134 and then receives notification that the file has also changed in cloud-based data store 106 (because system 136 has uploaded the changes). In this case, when sync file synchronization logic 122 in sync engine 114 receives the notification of changes from cloud data store 106, metadata computing logic 118 compares the corresponding metadata to the saved metadata that it received from system 136. It sees that they match so it can simply update the database entry for the file to indicate that the file is in sync. Therefore, file synchronization logic 122 in sync engine 114 first detects local updates to the disk in local file system 134. This is indicated by block 220. This can happen, for instance, when system 136 saves the file to local file system 134 and indicates this to sync engine 114 and sets the collaborative metadata properties. File synchronization logic 122 then detects updates to the corresponding file in cloud data store 106. This is indicated by block 222.

Metadata computing logic 118 then compares the collaborative metadata for the local and cloud versions of the file. Recall that application system 136 obtains the collaborative metadata for the file from system 102 when it uploads the file and saves it to local file system 134. It uses that collaborative metadata to call some properties on sync engine 114, and provides the metadata to sync engine 114. Server 104 also computes the collaborative metadata for a file when it is uploaded to data store 106 and provides that to sync engine 114. Metadata computing logic 118 compares them and finds that they match because they both came from the same source (i.e., server 104). This is indicated by block 224. Metadata computing logic 118 then updates the collaborative metadata and synchronizes it to data store 124 to indicate that the files are in sync. This is indicated by blocks 226 and 227.

Figure 4:
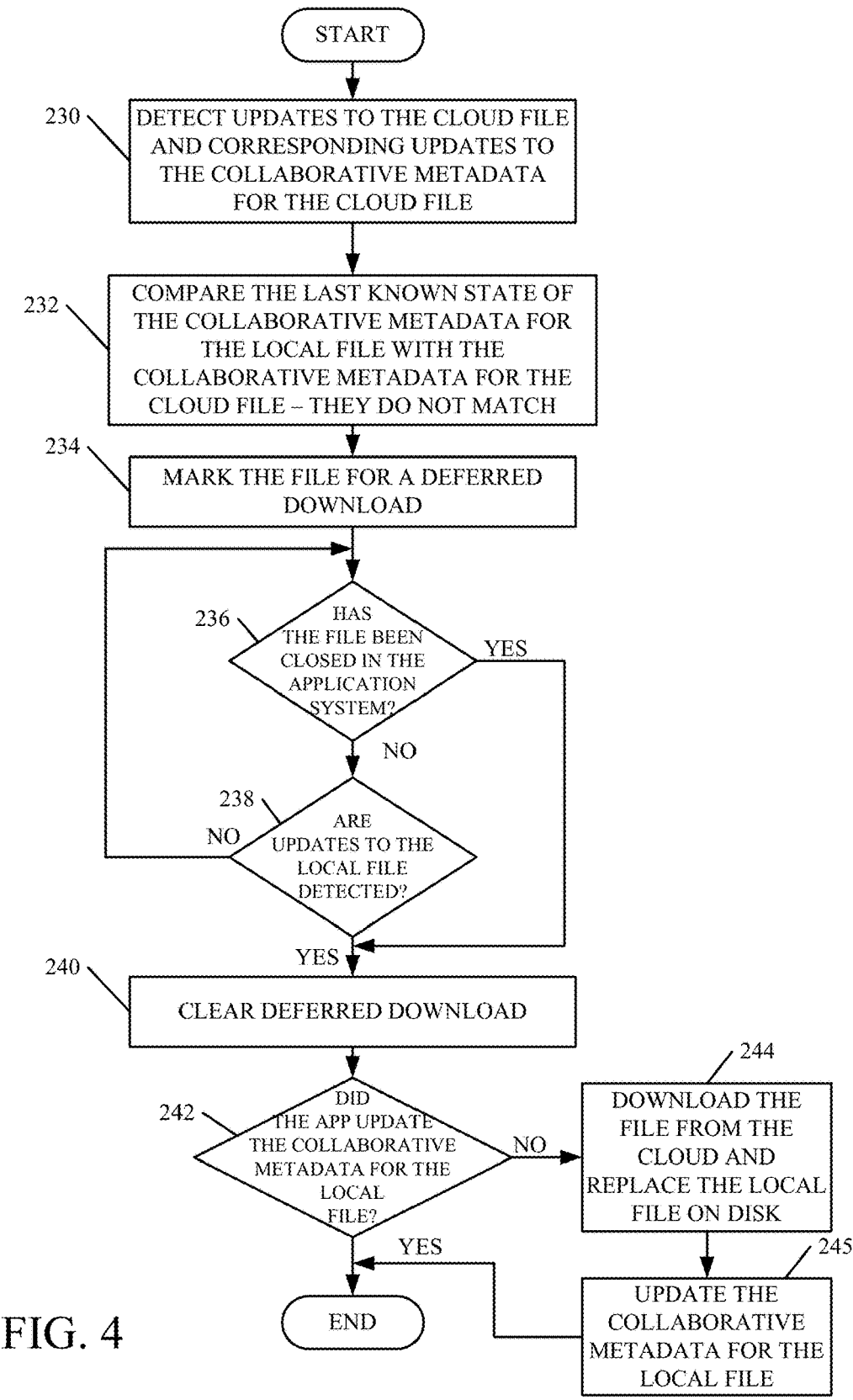

FIG. 4 is a flow diagram illustrating processing in architecture 100 for a second race condition. In the second race condition addressed by FIG. 4, sync engine 114 first sees the updates to a file in cloud data store 106 and then the updates on the local disk in local file system 134. In this case, metadata computing logic 118 compares the last known state of the collaborative metadata for the local file on file system 134 with what it downloaded from the cloud based on the changes to the file uploaded to data store 106. It will see that they do not match (because it has not yet seen the changes to the local file system 134) and thus marks the file to be in a deferred download state. In that case, the download will only be started if the file is no longer open by system 136.

The deferred download state will be cleared if and when the updates from system 136 are seen. Often, system 136 will update the collaborative metadata in sync engine 114 so that the collaborative metadata will match and the file will not be downloaded. However, if, for instance, system 136 crashes before it can send the collaborative metadata update, or, for some other reason, does not send the collaborative metadata update, sync engine 114 will recover the file by downloading the file (since it was deferred and will be periodically re-tried) from cloud data store 106 and replacing the file on disk in the local file system 134, thus ensuring a correct and stable state.

Thus, in FIG. 4, file synchronization logic 122 in sync engine 114 first detects updates to the cloud file and corresponding updates to the collaborative metadata for the cloud file. This is indicated by block 230 in FIG. 4. It then compares the last known state of the collaborative metadata for the local file with the collaborative metadata for the cloud file and finds that they do not match. This is indicated by block 232. File synchronization logic 122 thus marks the file for deferred download, as indicated by block 234. If the file has been closed in system 136, then the file is no longer marked for deferred download. This is indicated by block 236. However, if not, file synchronization logic 122 can still look for updates to the local file, in which case the collaborative metadata for the local file will also be updated in data store 124. This is indicated by block 238. In either case, the deferred download state for the file is cleared as indicated by block 240.

If system 136 has updated the collaborative metadata for the local file so that it matches that for the cloud file, then processing is completed, and the file does not need to be downloaded the file to the local disk. This is indicated by block 242. However, if, for some reason, system 136 did not update the collaborative metadata for the local file, then file synchronization logic 122 downloads the file from the cloud data store 106 and replaces the local file on the disk in local file system 134, with the downloaded file and updates the collaborative metadata for the local file. This is indicated by blocks 244 and 245. It will also be noted that, when system 136 did not update the collaborative metadata and it was downloaded by sync engine 114, the defined downloaded state may be cleared after the download is complete, instead of earlier as indicated by block 240.

Thus, even if system 136 crashed before it updates the collaborative metadata in sync engine 114, the correct version of the file will be synchronized from data store 106 to the local file system 134. Both sets of collaborative metadata will be updated.

Figure 5:
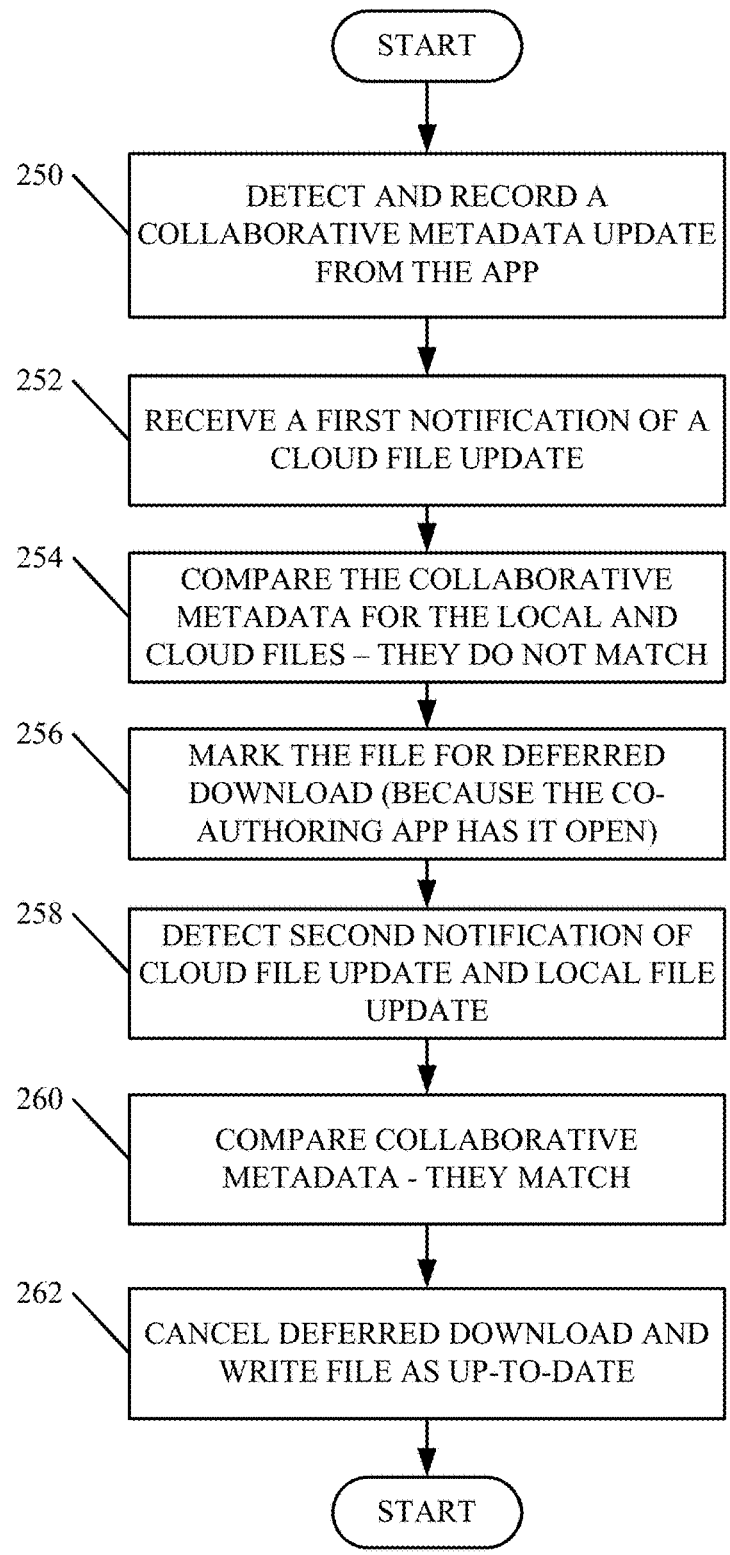

FIG. 5 is a flow diagram illustrating the operation of architecture 100 in handling yet another race condition. In this race condition, system 136 makes two edits. The first is uploaded to storage system 102, but not saved to disk in local file system 134. The second edit is uploaded to data store 106 and saved on local file system 134, and the corresponding collaborative metadata is computed and written to data store 124 in sync engine 114. Sync engine 114 sees the property update (based on the second edit) first, and then sees two notifications, one for each upload to data store 106. Of course, the first notification will be stale, as the second notification supersedes it. Thus, in FIG. 5, file synchronization logic 122 first detects and records the collaborative metadata update from system 136, based upon it saving the file to local file system 134 (recall that this is from the second edit). This is indicated by block 250. It then receives the first notification that the cloud file has been updated on data store 106 (recall that this is from the first edit). This is indicated by block 252. It then compares the collaborative metadata for the local and cloud files and finds that they do not match. This is indicated by block 254. It thus marks the file for deferred download, because it is open in system 136. This is indicated by block 256. If this download is ever attempted, it will fail because file synchronization logic 122 does not have a version tag that matches the version of the file on data store 106 (because it has not yet seen the second notification from cloud-based data storage system 102). Then, it sees the second notification from storage system 102. This is indicated by block 258. It then compares the collaborative metadata for the cloud file and the local file, and this time it finds that they match. This is indicated by block 260. Therefore, it cancels the deferred download state for the file and the file is written into the data store as being up-to-date. This is indicated by block 262.

Figure 6:
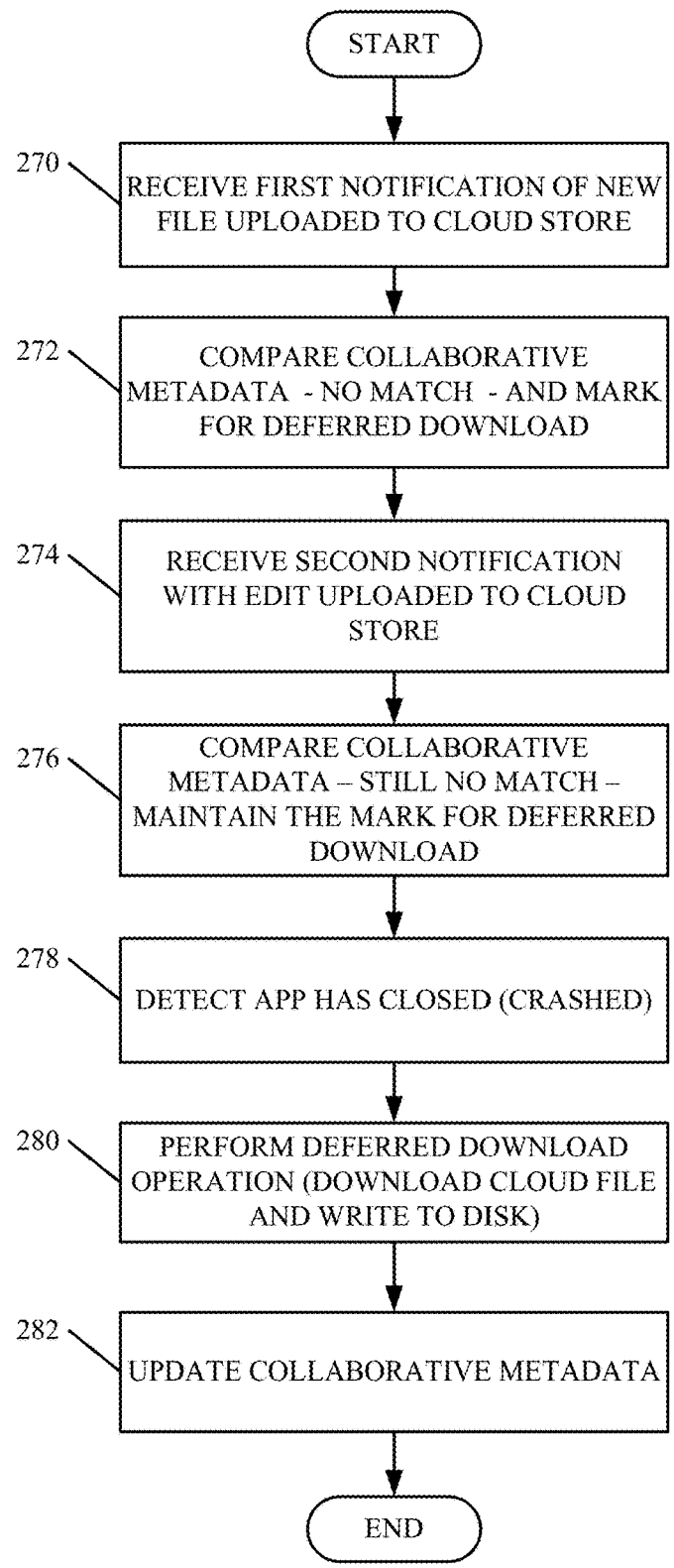

FIG. 6 is a flow diagram illustrating the operation of architecture 100 in addressing yet another race condition. In the race condition addressed by FIG. 6, system 136 creates a file and uploads it to cloud-based data store 106 but does not write it to the local disk in local file system 134. Sync engine 114 then receives the notification for the change in cloud data store 106. System 136 then makes an edit to the file and uploads that to data store 106, but crashes before it can write the file to disk in local file system 134. Sync engine 114 thus receives the notification for the edit to cloud data store 106 and properly synchronizes the file to local file system 134.

In this case, file synchronization logic 122 receives the first notification of the new file uploaded to cloud store 106. This is indicated by block 270 in FIG. 6. It then compares the collaborative metadata and finds that no match exists, and it marks the file for deferred download. This is indicated by block 272.

Logic 122 then receives the second notification representative of the edit that was uploaded to the cloud store 106. This is indicated by block 274. Metadata computing logic 118 compares the collaborative metadata and finds that still, no match exists. The file marking for deferred download is maintained. This is indicated by block 276. When system 136 crashes, file lock processing logic 120 determines that the system has crashed (or that it is no longer open) and the deferred download operation is performed. This is indicated by blocks 278 and 280. File synchronization logic 122 thus downloads the current version of the file from data store 106 to the local file system 134. It updates the collaborative metadata in data store 124 to reflect this. This is indicated by block 282.

It will be noted that FIGS. 3-6 show processing in accordance with a variety of different race conditions. Similar permutations to these types of conditions can be created when files are created instead of edited. This is slightly different, because it causes sync engine 114 to create an unrealized file entry in the data store if it hasn't heard about the change. Otherwise, the flows are similar to those described above.

It can thus be seen that even if system 136 does not write the file to the local disk or send updated collaborative metadata properties to sync engine 114, sync engine 114 properly recovers and downloads the file itself. The user thus always ends up with a correct and stable version of the file. Similarly, even if system 136 fails to upload the file to the cloud data store 106, but manages to write it to disk in the local file system 134 (regardless of whether it sends the updated collaborative metadata properties), sync engine 114 properly recovers and uploads the file itself. Again, the user ends up in a correct and stable state.

Further, there is only one source of truth about the file, and it is maintained in collaborative metadata store 124. This increases reliability.

Similarly, sync engine 114 serializes updates from cloud-based storage system 102 and from system 136, and handles them consistently. In one case, sync engine 114 hears about the new properties from system 136, and then from the cloud. However, if this is not the scenario, sync engine 114 handles the updates correctly anyway.

In addition, file change conflicts can occur. If they do, the behavior of architecture 100 depends upon whether sync engine 114 or system 136, itself, is synchronizing the file. If system 136 is synchronizing the file, then the conflict resolution behavior or functionality in the application 150 running on system 136 will take effect. This can include merging the documents, surfacing them for user conflict resolution, etc. If sync engine 114 is synchronizing the document, it can fork the file in the case of a conflict, or choose another resolution. For instance, it can rename the local file on local file system 134 to a new, unique name, and download a server copy from data store 106, in its place. All of these are contemplated herein.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Figure 7:
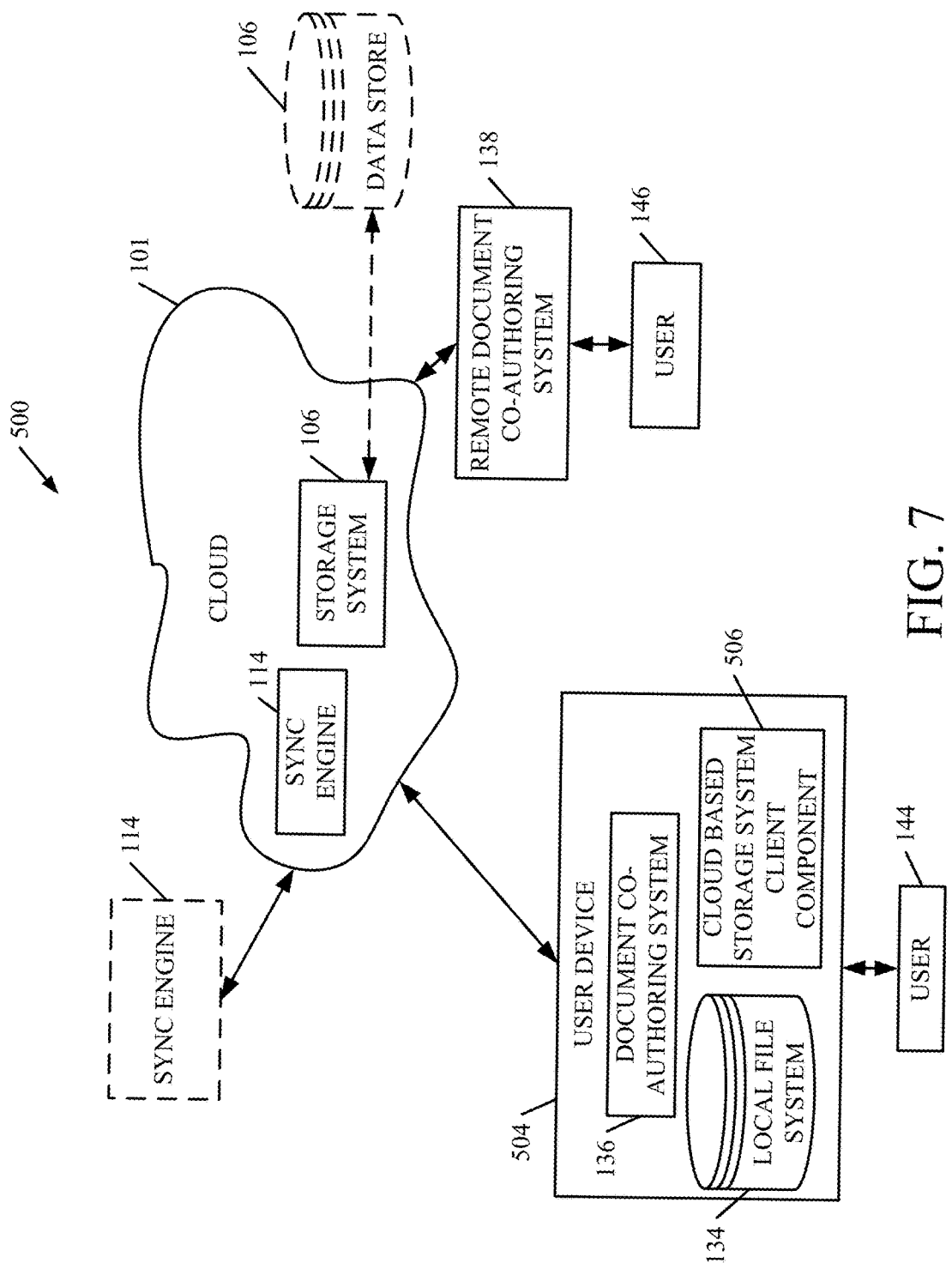
FIG. 7 is another block diagram of the architecture illustrated in FIG. 1, deployed in a different cloud computing architecture.

FIG. 7 is a block diagram of architecture 100, shown in FIG. 1, except that its elements are disposed in a different cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 7, some items are similar to those shown in FIG. 1 and they are similarly numbered. FIG. 7 specifically shows that storage system 106 and sync engine 114 are located in cloud 502 (which can be public, private, or a combination where portions are public while others are private). Therefore, user 144 uses a user device 504 that includes component 506 to access those systems through cloud 502.

FIG. 7 also depicts another example of a cloud architecture. FIG. 7 shows that it is also contemplated that some elements of architecture 100 are disposed in cloud 502 while others are not. By way of example, data store 106 can be disposed outside of cloud 502, and accessed through cloud 502. In another example, sync engine 114 is also outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
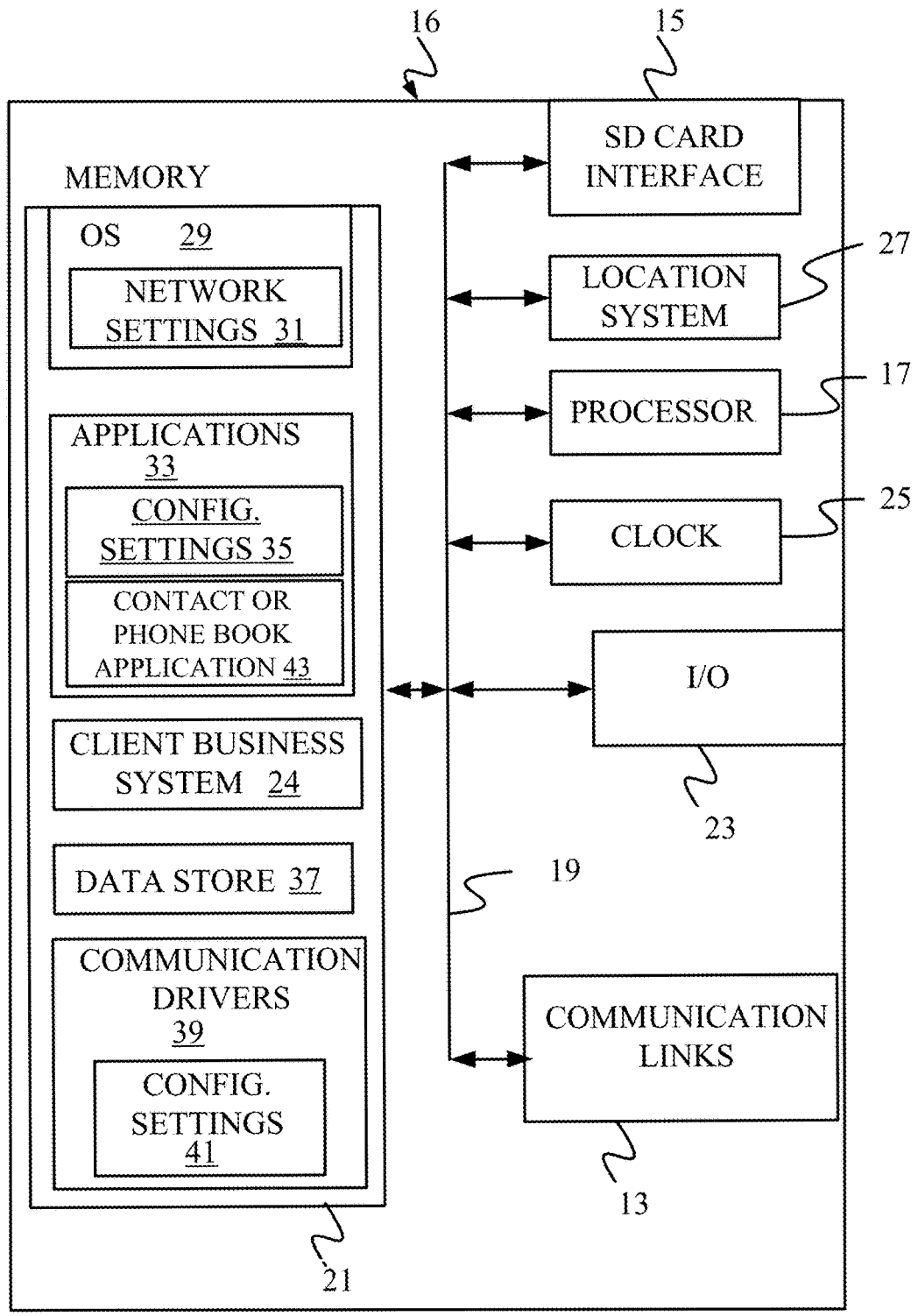
FIGS. 8-10 illustrate various examples of mobile devices that can be used in the architectures shown in the previous figures.
Figure 9:
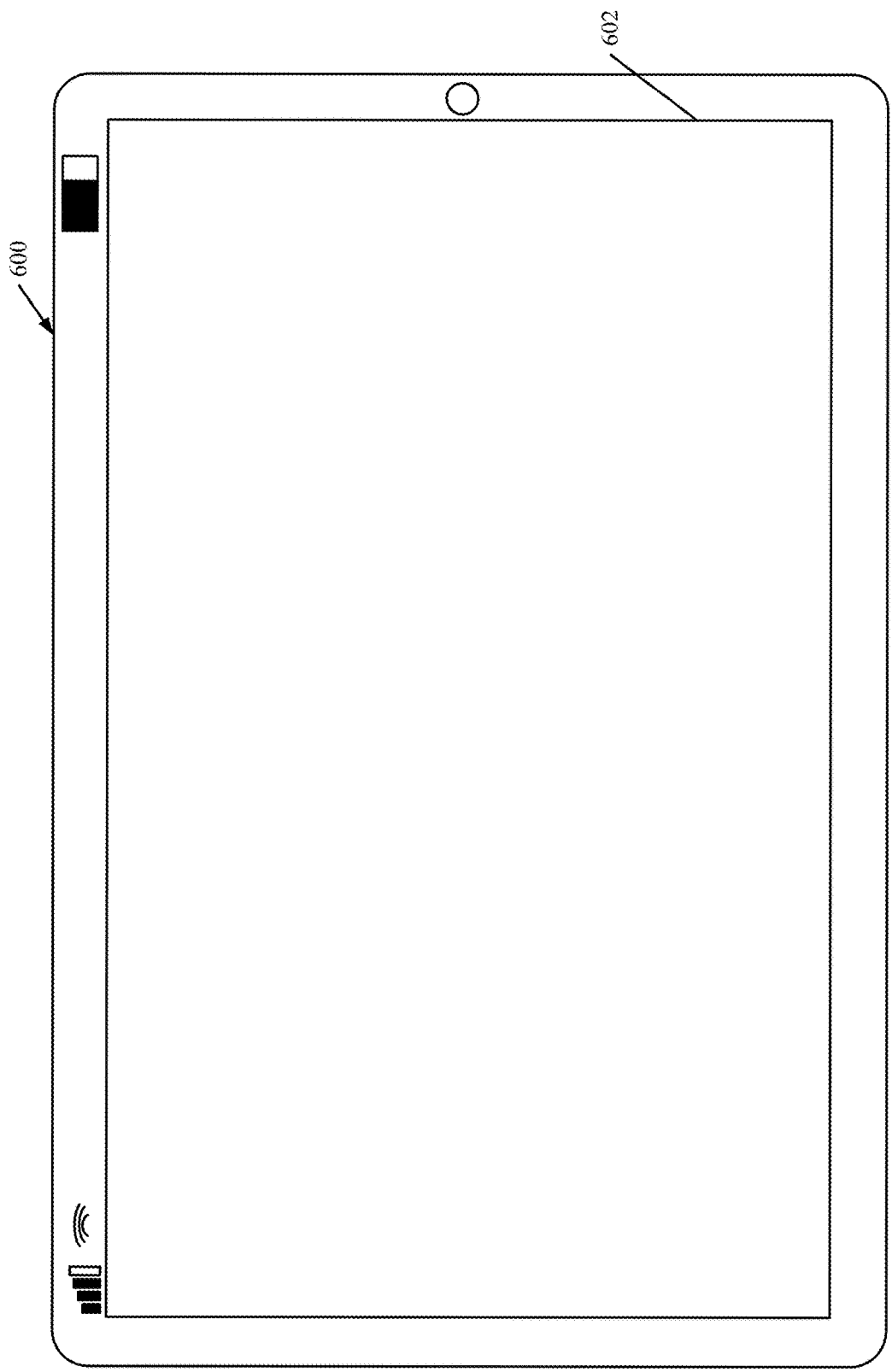
Figure 10:
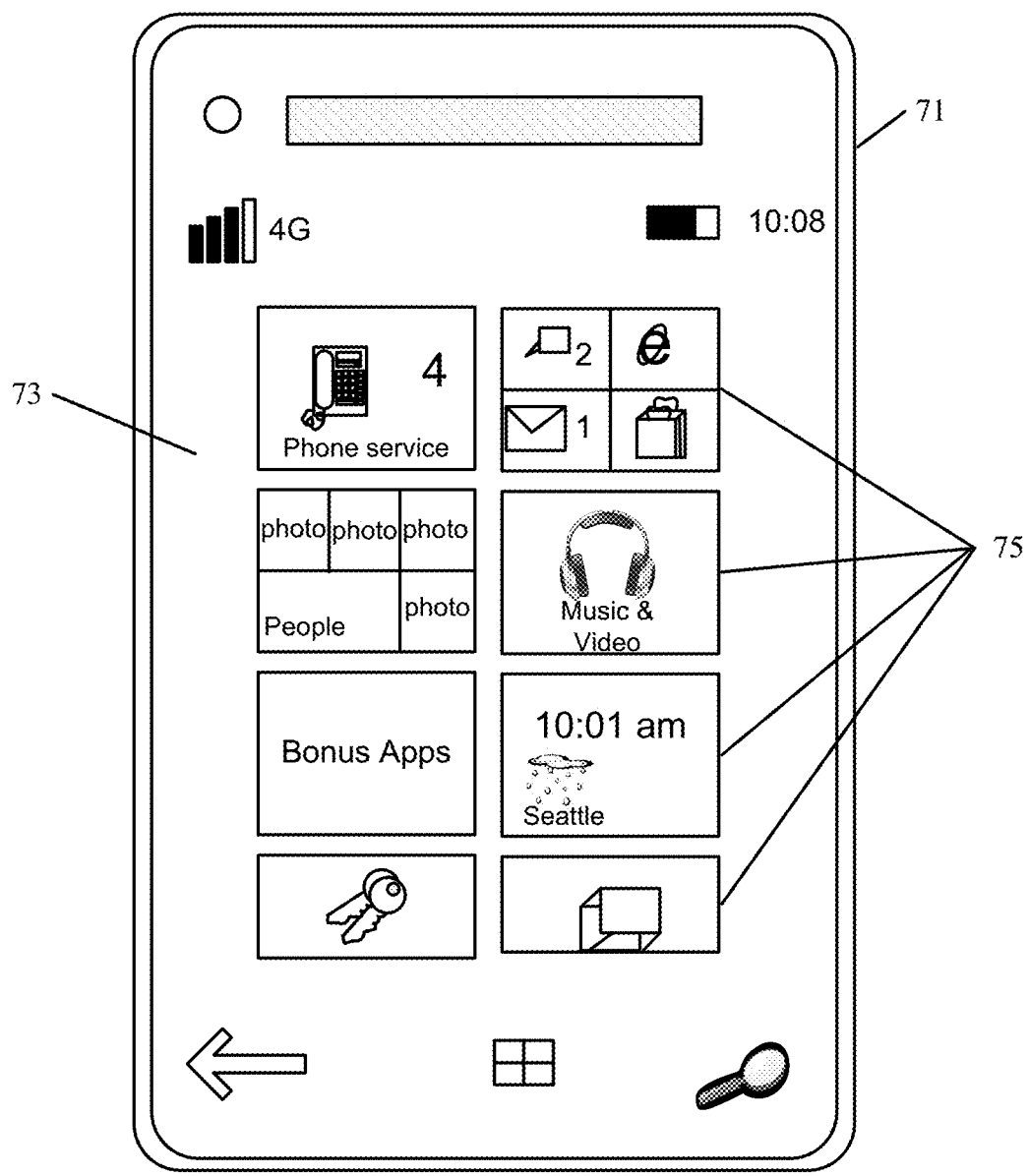

FIG. 8 is a simplified block diagram of one illustrative example of a handheld or mobile computing device that can be used as a user's or client's hand held device 16, in which the present system (or parts of it) can be deployed, and which can be used in architecture 100. FIGS. 9-10 are examples of handheld or mobile devices.

FIG. 8 provides a general block diagram of the components of a client device 16 that can run components architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various business applications or embody parts or all of architecture 100.

Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 9 shows one example in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. Device 16 can be, a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1Xrtt, and Short Message Service (SMS) signals. In some examples the phone also includes a Secure Digital (SD) card slot that accepts a SD card.

FIG. 10 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
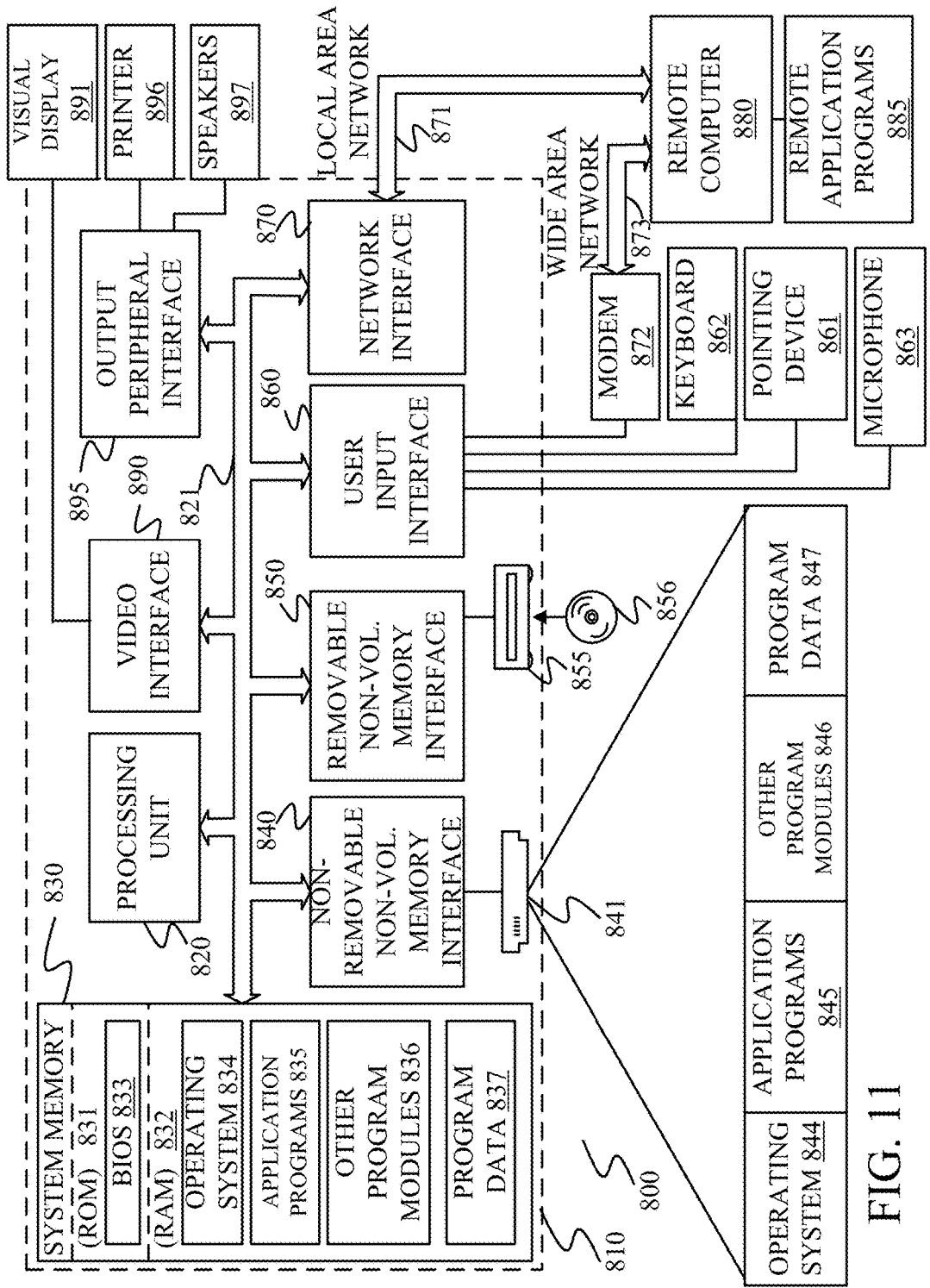
FIG. 11 is a block diagram of one example of a computing environment that can be deployed in the architectures shown in the previous figures.

FIG. 11 is one example of a computing environment in which architecture 100, or parts of it, (for example) can be deployed. With reference to FIG. 11, an example system for implementing some embodiments includes a general-purpose computing device in the form of a computer 810. Components of computer 810 may include, but are not limited to, a processing unit 820 (which can comprise processors or servers from other FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 11 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:
file synchronization logic that synchronizes changes to a file that has a corresponding cloud file stored on a cloud based storage system and a corresponding local file stored on a local file system;
backoff processing logic that receives a backoff indicator corresponding to the file and determines, based on the backoff indicator, whether the file synchronization logic is to synchronize the changes to the file or to backoff and allow the changes to be synchronized by a co-authoring application and
metadata computing logic that maintains a first set of collaborative metadata indicative of content and a version of the cloud file and a second set of collaborative metadata indicative of content and a version of the local file.

Example 2 is the computing system of any or all previous examples wherein the backoff processing logic determines whether the file synchronization logic is to backoff by determining whether the file is open by a co-authoring application and, if so, indicates to the file synchronization logic that the file is locked.

Example 3 is the computing system of any or all previous examples wherein the computing system exposes a metadata interface that can be invoked by the co-authoring application to obtain and set the collaborative metadata for the local file.

Example 4 is the computing system of any or all previous examples wherein the metadata computing logic maintains the first set of collaborative metadata by generating a first hash value that is a hash of the content of the cloud file and a first waterline value that uniquely identifies a version of the contents of the cloud file.

Example 5 is the computing system of any or all previous examples wherein the file synchronization logic detects changes to the cloud file and changes to the local file and, in response, the metadata computing logic compares the first set of collaborative metadata to the second set of collaborative metadata and, if there is a match, determines that the cloud file and the local file are synchronized with one another.

Example 6 is the computing system of any or all previous examples wherein when the file synchronization logic detects updates to the cloud file, but does not detect changes to the local file, the metadata computing logic determines that the first and second set of collaborative metadata do not match and the backoff processing logic is configured to determine that the file is locked until either the file is closed in the co-authoring application or the until the second set of collaborative metadata for the local file is updated by the co-authoring application.

Example 7 is the computing system of any or all previous examples wherein the file synchronization logic is configured to, in response to detecting a change to the local file or the cloud file, and in response to the metadata computing logic determining that the first and second sets of collaborative metadata do not match, determine which of the cloud file and the local file changed and synchronize the cloud file with the local file, based on which file changed.

Example 8 is the computing system of any or all previous examples wherein the metadata computing logic maintains the first and second sets of collaborative metadata regardless of whether the backoff processing logic determines that the file is locked.

Example 9 is a computer implemented method of synchronizing a file, wherein the file is stored on a cloud-based storage system as a cloud-based file, and on a local file system as a corresponding local file, comprising:

receiving notification that the cloud-based file or the local file has changed;

determining whether an application, associated with the file, has the file open;

if the application has the file open, then determining that the application is to synchronize the cloud-based file with the local file;

if the application does not have the file open, then synchronizing the cloud-based file and the local file, based on the changes; and updating a first set of collaborative metadata corresponding to the cloud-based file and a second set of collaborative metadata corresponding to the local file in a metadata store accessible by the application and the cloud-based storage system, the first and second sets of collaborative metadata identifying a version and content of the corresponding file.

Example 10 is the computer implemented method of any or all previous examples wherein determining whether the application has the file open comprises:

determining whether the application supports co-authoring functionality.

Example 11 is the computer implemented method of any or all previous examples wherein determining whether the application has the file open comprises:

determining whether the application has the file open in a co-authoring mode.

Example 12 is the computer implemented method of any or all previous examples wherein determining whether the application has the file open in a co-authoring mode, comprises:

attempting to perform an operation with respect to the file that is precluded when the document is open in the application in the co-authoring mode; and determining whether the operation is successful.

Example 13 is the computer implemented method of any or all previous examples wherein updating the first and second sets of collaborative metadata, for each set of collaborative metadata, comprises:

updating a hash value that comprises a hash of content in the corresponding file that can be co-authored.

Example 14 is the computer implemented method of any or all previous examples wherein updating the first and second sets of collaborative metadata, for each set of collaborative metadata, comprises:

updating a waterline value that uniquely identifies a version of the content of the corresponding file.

Example 15 is the computer implemented method of any or all previous examples wherein updating the first and second sets of collaborative metadata comprises:

exposing a metadata interface that can be invoked by the application to obtain and set the collaborative metadata for the local file.

Example 16 is the computer implemented method of any or all previous examples wherein determining that the application is to synchronize the cloud-based file with the local file, comprises:

marking the file for a deferred download for synchronization after the application closes the file;

after the application no longer has the file open, comparing the first and second sets of collaborative metadata;

if the first and second sets of collaborative metadata match, then determining that the cloud-based file and the local file are already synchronized; and if the first and second sets of collaborative metadata do not match, then synchronizing the cloud-based file and the local file.

Example 17 is the computer implemented method of any or all previous examples wherein updating the first and second sets of collaborative metadata comprises:

storing the first and second sets of collaborative metadata in the metadata store that comprises a single source of the first and second sets of collaborative metadata for both the cloud-based storage system and the application.

Example 18 is a computing system, comprising:

file synchronization logic that synchronizes changes to a file that has a corresponding cloud file stored on a cloud based storage system and a corresponding local file stored on a local file system;

backoff processing logic that determines whether the file is open by a co-authoring application and, if so, indicates to the file synchronization logic that the file is locked; and metadata computing logic that maintains a first set of collaborative metadata indicative of content and a version of the cloud file and a second set of collaborative metadata indicative of content and a version of the local file in a metadata store that comprises a single source for the stored first and second sets of collaborative metadata for both the co-authoring application and the cloud based storage system.

Example 19 is the computing system of any or all previous examples wherein once the file is unlocked, the metadata computing logic is configured to determine whether the first and second sets of collaborative metadata match one another, if so, the file synchronization logic is configured to determine that the co-authoring application has already synchronized the changes.

Example 20 is the computing system of any or all previous examples wherein the metadata computing logic is configured to maintain the first set of collaborative metadata by generating a first hash value that is a hash of the content of the cloud file and a first waterline value that uniquely identifies a version of the contents of the cloud file, and maintains the second set of collaborative metadata by maintaining a second hash value that is a hash of the content of the local file and a second waterline value that uniquely identifies a version of the contents of the local file.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
    file synchronization logic that synchronizes changes to a file that has a corresponding cloud file stored on a cloud based storage system and a corresponding local file stored on a local file system;
    backoff processing logic that receives a backoff indicator corresponding to the file and determines, based on the backoff indicator, whether the file synchronization logic is to synchronize the changes to the file or to backoff and allow the changes to be synchronized by a co-authoring application and
    metadata computing logic that maintains a first set of collaborative metadata indicative of content and a version of the cloud file and a second set of collaborative metadata indicative of content and a version of the local file.

2. The computing system of claim 1 wherein the backoff processing logic determines whether the file synchronization logic is to backoff by determining whether the file is open by a co-authoring application and, if so, indicates to the file synchronization logic that the file is locked.

3. The computing system of claim 1 wherein the computing system exposes a metadata interface that can be invoked by the co-authoring application to obtain and set the collaborative metadata for the local file.

4. The computing system of claim 3 wherein the metadata computing logic maintains the first set of collaborative metadata by generating a first hash value that is a hash of the content of the cloud file and a first waterline value that uniquely identifies a version of the contents of the cloud file.

5. The computing system of claim 3 wherein the file synchronization logic detects changes to the cloud file and changes to the local file and, in response, the metadata computing logic compares the first set of collaborative metadata to the second set of collaborative metadata and, if there is a match, determines that the cloud file and the local file are synchronized with one another.

6. The computing system of claim 3 wherein when the file synchronization logic detects updates to the cloud file, but does not detect changes to the local file, the metadata computing logic determines that the first and second set of collaborative metadata do not match and the backoff processing logic is configured to determine that the file is locked until either the file is closed in the co-authoring application or the until the second set of collaborative metadata for the local file is updated by the co-authoring application.

7. The computing system of claim 3 wherein the file synchronization logic is configured to, in response to detecting a change to the local file or the cloud file, and in response to the metadata computing logic determining that the first and second sets of collaborative metadata do not match, determine which of the cloud file and the local file changed and synchronize the cloud file with the local file, based on which file changed.

8. The computing system of claim 3 wherein the metadata computing logic maintains the first and second sets of collaborative metadata regardless of whether the backoff processing logic determines that the file is locked.

9. A computer implemented method of synchronizing a file, wherein the file is stored on a cloud-based storage system as a cloud-based file, and on a local file system as a corresponding local file, comprising:
receiving notification that the cloud-based file or the local file has changed;
determining whether an application, associated with the file, has the file open;
if the application has the file open, then determining that the application is to synchronize the cloud-based file with the local file;
if the application does not have the file open, then synchronizing the cloud-based file and the local file, based on the changes; and
updating a first set of collaborative metadata corresponding to the cloud-based file and a second set of collaborative metadata corresponding to the local file in a metadata store accessible by the application and the cloud-based storage system, the first and second sets of collaborative metadata identifying a version and content of the corresponding file.

10. The computer implemented method of claim 9 wherein determining whether the application has the file open comprises:
determining whether the application supports co-authoring functionality.

11. The computer implemented method of claim 10 wherein determining whether the application has the file open comprises:
determining whether the application has the file open in a co-authoring mode.

12. The computer implemented method of claim 11 wherein determining whether the application has the file open in a co-authoring mode, comprises:
attempting to perform an operation with respect to the file that is precluded when the document is open in the application in the co-authoring mode; and
determining whether the operation is successful.

13. The computer implemented method of claim 10 wherein updating the first and second sets of collaborative metadata, for each set of collaborative metadata, comprises:
updating a hash value that comprises a hash of content in the corresponding file that can be co-authored.

14. The computer implemented method of claim 13 wherein updating the first and second sets of collaborative metadata, for each set of collaborative metadata, comprises:
updating a waterline value that uniquely identifies a version of the content of the corresponding file.

15. The computer implemented method of claim 10 wherein updating the first and second sets of collaborative metadata comprises:
exposing a metadata interface that can be invoked by the application to obtain and set the collaborative metadata for the local file.

16. The computer implemented method of claim 9 wherein determining that the application is to synchronize the cloud-based file with the local file, comprises:
marking the file for a deferred download for synchronization after the application closes the file;
after the application no longer has the file open, comparing the first and second sets of collaborative metadata;
if the first and second sets of collaborative metadata match, then determining that the cloud-based file and the local file are already synchronized; and
if the first and second sets of collaborative metadata do not match, then synchronizing the cloud-based file and the local file.

17. The computer implemented method of claim 9 wherein updating the first and second sets of collaborative metadata comprises:
storing the first and second sets of collaborative metadata in the metadata store that comprises a single source of the first and second sets of collaborative metadata for both the cloud-based storage system and the application.

18. A computing system, comprising:
file synchronization logic that synchronizes changes to a file that has a corresponding cloud file stored on a cloud based storage system and a corresponding local file stored on a local file system;
backoff processing logic that determines whether the file is open by a co-authoring application and, if so, indicates to the file synchronization logic that the file is locked; and
metadata computing logic that maintains a first set of collaborative metadata indicative of content and a version of the cloud file and a second set of collaborative metadata indicative of content and a version of the local file in a metadata store that comprises a single source for the stored first and second sets of collaborative metadata for both the co-authoring application and the cloud based storage system.

19. The computing system of claim 18 wherein once the file is unlocked, the metadata computing logic is configured to determine whether the first and second sets of collaborative metadata match one another, if so, the file synchronization logic is configured to determine that the co-authoring application has already synchronized the changes.

20. The computing system of claim 19 wherein the metadata computing logic is configured to maintain the first set of collaborative metadata by generating a first hash value that is a hash of the content of the cloud file and a first waterline value that uniquely identifies a version of the contents of the cloud file, and maintains the second set of collaborative metadata by maintaining a second hash value that is a hash of the content of the local file and a second waterline value that uniquely identifies a version of the contents of the local file.

* * * * *